US007359498B2

(12) United States Patent
Faber et al.

(10) Patent No.: US 7,359,498 B2
(45) Date of Patent: Apr. 15, 2008

(54) SYSTEMS AND METHODS FOR ARRANGING A CALL

(75) Inventors: Scott Faber, San Francisco, CA (US); Ron Hirson, San Francisco, CA (US); James D. Migdal, San Francisco, CA (US); Henrik Axel Ebbe Altberg, Mill Valley, CA (US); Sean David Van der Linden, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 403 days.

(21) Appl. No.: 10/460,776

(22) Filed: Jun. 12, 2003

(65) Prior Publication Data

US 2004/0252820 A1 Dec. 16, 2004

(51) Int. Cl.
*H04M 3/42* (2006.01)
(52) U.S. Cl. .............................. 379/210.01; 379/209.01
(58) Field of Classification Search ........... 379/210.01, 379/209; 705/9
See application file for complete search history.

(56) References Cited

U.S. PATENT DOCUMENTS

| | | | |
|---|---|---|---|
| 4,313,035 A | | 1/1982 | Jordan et al. |
| 4,577,065 A | | 3/1986 | Frey et al. |
| 4,631,428 A | | 12/1986 | Grimes |
| 4,645,873 A | | 2/1987 | Chomet |
| 4,677,434 A | | 6/1987 | Fascenda |
| 4,723,283 A | | 2/1988 | Nagasawa et al. |
| 4,751,669 A | | 6/1988 | Sturgis et al. |
| 4,752,675 A | | 6/1988 | Zetmeir |
| 4,847,890 A | | 7/1989 | Solomon et al. |
| 4,878,239 A | | 10/1989 | Solomon et al. |
| 4,969,185 A | * | 11/1990 | Dorst et al. ............ 379/210.01 |
| 5,017,917 A | | 5/1991 | Fisher et al. |
| 5,058,152 A | | 10/1991 | Solomon et al. |
| 5,148,474 A | | 9/1992 | Haralambopoulos et al. |
| 5,155,743 A | | 10/1992 | Jacobs |
| 5,182,769 A | | 1/1993 | Yamaguchi et al. |
| 5,206,903 A | * | 4/1993 | Kohler et al. .......... 379/265.12 |
| 5,319,542 A | | 6/1994 | King, Jr. et al. |
| 5,325,424 A | | 6/1994 | Grube |

(Continued)

FOREIGN PATENT DOCUMENTS

AU 699785 5/1995

(Continued)

OTHER PUBLICATIONS

The Voice of Technology, Credit World, pp. 20-23, Jul. 1994.

(Continued)

*Primary Examiner*—Harry S. Hong
(74) *Attorney, Agent, or Firm*—John P. Ward; Greenberg Traurig LLP (57) ABSTRACT

According to one embodiment of the present invention, a method of arranging a call with a service provider is disclosed. The method includes: determining whether the service provider accepts arranged calls; if it is determined that the service provider does not accept arranged calls, contacting the service provider to request arranged calls from the service provider; and if it is determined that the service provider accepts arranged calls, requesting an arranged call.

21 Claims, 4 Drawing Sheets

U.S. PATENT DOCUMENTS

| | | | |
|---|---|---|---|
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,448,625 A | 9/1995 | Lederman |
| 5,453,352 A | 9/1995 | Tachibana |
| 5,459,779 A | 10/1995 | Backaus et al. |
| 5,469,497 A | 11/1995 | Pierce et al. |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,555,298 A | 9/1996 | Jonsson |
| 5,557,677 A | 9/1996 | Prytz |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,604,803 A | 2/1997 | Aziz |
| 5,608,786 A | 3/1997 | Gordon |
| 5,615,213 A | 3/1997 | Griefer |
| 5,619,148 A | 4/1997 | Guo |
| 5,619,570 A | 4/1997 | Tsutsui |
| 5,619,725 A | 4/1997 | Gordon |
| 5,619,991 A | 4/1997 | Sloane |
| 5,623,536 A | 4/1997 | Solomon et al. |
| 5,634,012 A | 5/1997 | Stefik et al. |
| 5,638,432 A | 6/1997 | Wille et al. |
| 5,651,058 A | 7/1997 | Hackett-Jones et al. |
| 5,668,953 A | 9/1997 | Sloo |
| 5,675,734 A | 10/1997 | Hair |
| 5,694,163 A | 12/1997 | Harrison |
| 5,694,537 A | 12/1997 | Montenegro et al. |
| 5,694,549 A | 12/1997 | Carlin et al. |
| 5,701,419 A | 12/1997 | McConnell |
| 5,710,887 A | 1/1998 | Chelliah et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,734,961 A | 3/1998 | Castille |
| 5,740,231 A | 4/1998 | Cohn et al. |
| 5,745,681 A | 4/1998 | Levine et al. |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Patrecca et al. |
| 5,794,210 A | 8/1998 | Goldhaber et al. |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kanai et al. |
| 5,835,896 A | 11/1998 | Fisher et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,903,877 A | 5/1999 | Berkowitz et al. |
| 5,907,677 A | 5/1999 | Glenn et al. |
| 5,911,132 A | 6/1999 | Sloane |
| 5,914,951 A | 6/1999 | Bentley et al. |
| 5,915,214 A | 6/1999 | Reece et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,943,422 A | 8/1999 | Van Wie et al. |
| 5,946,646 A | 8/1999 | Schena et al. |
| 5,948,054 A | 9/1999 | Nielsen |
| 5,960,416 A | 9/1999 | Block |
| 5,974,141 A | 10/1999 | Saito |
| 5,974,398 A | 10/1999 | Hanson et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A * | 11/1999 | Dezonno et al. ....... 379/265.09 |
| 5,999,609 A | 12/1999 | Nishimura |
| 5,999,611 A | 12/1999 | Tatchell et al. |
| 6,006,197 A | 12/1999 | d-Eon et al. |
| 6,011,794 A | 1/2000 | Mordowitz et al. |
| 6,014,439 A | 1/2000 | Walker et al. |
| 6,014,644 A | 1/2000 | Erickson |
| 6,016,478 A | 1/2000 | Zhang et al. |
| 6,026,087 A | 2/2000 | Mirashrafi et al. |
| 6,026,148 A | 2/2000 | Dworkin et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardener et al. |
| 6,067,561 A | 5/2000 | Dillon |
| 6,078,866 A | 6/2000 | Buck et al. |
| 6,130,933 A | 10/2000 | Miloslavsky |
| 6,131,085 A | 10/2000 | Rossides |
| 6,144,670 A | 11/2000 | Sponaugle et al. |
| 6,167,379 A | 12/2000 | Dean et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,185,289 B1 | 2/2001 | Hetz et al. |
| 6,188,673 B1 | 2/2001 | Bauer et al. |
| 6,188,761 B1 | 2/2001 | Dickerman et al. |
| 6,192,050 B1 | 2/2001 | Stovall |
| 6,199,096 B1 | 3/2001 | Mirashrafi et al. |
| 6,212,192 B1 | 4/2001 | Mirashrafi et al. |
| 6,212,268 B1 * | 4/2001 | Nielsen ................ 379/210.01 |
| 6,216,111 B1 | 4/2001 | Walker et al. |
| 6,223,165 B1 | 4/2001 | Lauffer |
| 6,230,287 B1 | 5/2001 | Pinard et al. |
| 6,233,566 B1 | 5/2001 | Levine et al. |
| 6,243,684 B1 | 6/2001 | Stuart et al. |
| 6,246,875 B1 | 6/2001 | Seazholtz et al. |
| 6,248,946 B1 | 6/2001 | Dwek |

| | | | |
|---|---|---|---|
| 6,259,774 B1 | 7/2001 | Miloslavsky | |
| 6,266,651 B1 | 7/2001 | Wooston | |
| 6,269,336 B1 | 7/2001 | Ladd et al. | |
| 6,269,361 B1 | 7/2001 | Davis et al. | |
| 6,282,515 B1 | 8/2001 | Speicher | |
| 6,292,799 B1 | 9/2001 | Peek et al. | |
| 6,298,056 B1 | 10/2001 | Pendse | |
| 6,301,342 B1 | 10/2001 | Ander et al. | |
| 6,304,637 B1 | 10/2001 | Mirashrafi et al. | |
| 6,310,941 B1 | 10/2001 | Crutcher et al. | |
| 6,311,231 B1 * | 10/2001 | Bateman et al. | 379/265.09 |
| 6,314,402 B1 | 11/2001 | Monaco et al. | |
| 6,314,454 B1 | 11/2001 | Wang et al. | |
| 6,323,894 B1 | 11/2001 | Katz | |
| 6,353,663 B1 | 3/2002 | Stevens et al. | |
| 6,385,583 B1 | 5/2002 | Ladd et al. | |
| 6,389,278 B1 | 5/2002 | Singh | |
| 6,389,541 B1 | 5/2002 | Patterson | |
| 6,393,117 B1 | 5/2002 | Trell | |
| 6,393,412 B1 | 5/2002 | Deep | |
| 6,400,806 B1 | 6/2002 | Uppaluru | |
| 6,404,864 B1 | 6/2002 | Evslin et al. | |
| 6,404,877 B1 | 6/2002 | Bolduc et al. | |
| 6,404,884 B1 | 6/2002 | Marwell et al. | |
| 6,430,276 B1 | 8/2002 | Bouvier et al. | |
| 6,434,527 B1 | 8/2002 | Horvitz | |
| 6,463,136 B1 | 10/2002 | Malik | |
| 6,470,079 B1 | 10/2002 | Benson | |
| 6,470,317 B1 | 10/2002 | Ladd et al. | |
| 6,470,338 B1 | 10/2002 | Rizzo et al. | |
| 6,477,246 B1 | 11/2002 | Dolan et al. | |
| 6,484,148 B1 | 11/2002 | Boyd | |
| 6,493,437 B1 | 12/2002 | Olshansky | |
| 6,493,671 B1 | 12/2002 | Ladd et al. | |
| 6,493,673 B1 | 12/2002 | Ladd et al. | |
| 6,510,417 B1 | 1/2003 | Woods et al. | |
| 6,513,013 B1 | 1/2003 | Stephanou | |
| 6,519,570 B1 | 2/2003 | Faber et al. | |
| 6,523,010 B2 | 2/2003 | Lauffer | |
| 6,523,101 B1 | 2/2003 | Nakata | |
| 6,529,878 B2 | 3/2003 | De Rafael et al. | |
| 6,539,359 B1 | 3/2003 | Ladd et al. | |
| 6,542,732 B1 | 4/2003 | Khazaka et al. | |
| 6,546,372 B2 | 4/2003 | Lauffer | |
| 6,549,889 B2 | 4/2003 | Lauffer | |
| 6,560,576 B1 | 5/2003 | Cohen et al. | |
| 6,563,915 B1 | 5/2003 | Salimando | |
| 6,606,376 B1 | 8/2003 | Trell | |
| 6,609,106 B1 | 8/2003 | Robertson | |
| 6,611,501 B1 | 8/2003 | Owen et al. | |
| 6,625,595 B1 | 9/2003 | Anderson et al. | |
| 6,636,590 B1 | 10/2003 | Jacob et al. | |
| 6,658,389 B1 | 12/2003 | Alpdemir | |
| 6,668,286 B2 * | 12/2003 | Bateman et al. | 710/6 |
| 6,704,403 B2 | 3/2004 | Lurie et al. | |
| 6,731,625 B1 * | 5/2004 | Eastep et al. | 370/352 |
| 6,741,691 B1 * | 5/2004 | Ritter et al. | 379/210.01 |
| 6,757,364 B2 | 6/2004 | Newkirk | |
| 6,771,760 B1 * | 8/2004 | Vortman et al. | 379/209.01 |
| 6,775,359 B1 * | 8/2004 | Ron et al. | 379/88.14 |
| 6,798,753 B1 | 9/2004 | Doganata et al. | |
| 6,801,899 B2 | 10/2004 | Lauffer | |
| 6,807,532 B1 | 10/2004 | Kolls | |
| 6,836,225 B2 | 12/2004 | Lee et al. | |
| 6,865,540 B1 | 3/2005 | Faber et al. | |
| 6,898,435 B2 * | 5/2005 | Milman | 455/457 |
| 6,968,174 B1 | 11/2005 | Trandal et al. | |
| 7,032,030 B1 | 4/2006 | Codignotto | |
| 2001/0012357 A1 | 8/2001 | Mirashrafi et al. | |
| 2001/0025274 A1 | 9/2001 | Zehr et al. | |
| 2001/0026609 A1 | 10/2001 | Weinstein et al. | |
| 2001/0027481 A1 | 10/2001 | Whyel | |
| 2001/0029482 A1 | 10/2001 | Tealdi et al. | |
| 2001/0032247 A1 | 10/2001 | Kanaya | |
| 2001/0036822 A1 | 11/2001 | Mead et al. | |
| 2001/0037283 A1 | 11/2001 | Mullaney | |
| 2001/0044751 A1 | 11/2001 | Pugliese et al. | |
| 2001/0048737 A1 | 12/2001 | Goldberg et al. | |
| 2002/0003867 A1 | 1/2002 | Rothschild et al. | |
| 2002/0010608 A1 | 1/2002 | Faber et al. | |
| 2002/0010616 A1 * | 1/2002 | Itzhaki | 705/9 |
| 2002/0024948 A1 | 2/2002 | Pendse | |
| 2002/0029241 A1 | 3/2002 | Yokono et al. | |
| 2002/0038233 A1 | 3/2002 | Shubov et al. | |
| 2002/0038293 A1 | 3/2002 | Seiden | |
| 2002/0042826 A1 | 4/2002 | Gaus et al. | |
| 2002/0059082 A1 | 5/2002 | Moczygemba | |
| 2002/0065959 A1 | 5/2002 | Kim et al. | |
| 2002/0071423 A1 | 6/2002 | Mirashrafi et al. | |
| 2002/0071426 A1 | 6/2002 | Karamchedu et al. | |
| 2002/0072974 A1 | 6/2002 | Pugliese et al. | |
| 2002/0073207 A1 | 6/2002 | Widger et al. | |
| 2002/0087565 A1 | 7/2002 | Hoekman et al. | |
| 2002/0091607 A1 | 7/2002 | Sloan et al. | |
| 2002/0094074 A1 | 7/2002 | Lurie | |
| 2002/0095331 A1 | 7/2002 | Osmar et al. | |
| 2002/0095359 A1 | 7/2002 | Mangetsu | |
| 2002/0107697 A1 | 8/2002 | Jensen | |
| 2002/0112005 A1 | 8/2002 | Namias | |
| 2002/0116266 A1 | 8/2002 | Marshall | |
| 2002/0120554 A1 | 8/2002 | Vega | |
| 2002/0128891 A1 | 9/2002 | McSherry | |
| 2002/0133402 A1 | 9/2002 | Faber et al. | |
| 2002/0133570 A1 | 9/2002 | Jacob et al. | |
| 2002/0133571 A1 | 9/2002 | Jacob et al. | |
| 2002/0169836 A1 | 11/2002 | Hood et al. | |
| 2002/0191762 A1 | 12/2002 | Benson | |
| 2002/0193094 A1 | 12/2002 | Lawless et al. | |
| 2002/0193135 A1 | 12/2002 | Nakano | |
| 2003/0005126 A1 | 1/2003 | Schwartz et al. | |
| 2003/0043981 A1 | 3/2003 | Lurie et al. | |
| 2003/0046161 A1 | 3/2003 | Kamanger et al. | |
| 2003/0061094 A1 | 3/2003 | Banerjee et al. | |
| 2003/0112944 A1 * | 6/2003 | Brown et al. | 379/201.01 |
| 2003/0115089 A1 | 6/2003 | Lurie | |
| 2003/0126205 A1 | 7/2003 | Lurie | |
| 2003/0220866 A1 | 11/2003 | Pisaris-Henderson | |
| 2003/0223565 A1 | 12/2003 | Montemer | |
| 2003/0225682 A1 | 12/2003 | Montemer | |
| 2004/0006511 A1 | 1/2004 | Montemer | |
| 2004/0010518 A1 | 1/2004 | Montemer | |
| 2004/0023644 A1 | 2/2004 | Montemer | |
| 2004/0066927 A1 * | 4/2004 | Horvath et al. | 379/210.01 |
| 2004/0083133 A1 | 4/2004 | Nicholas et al. | |
| 2004/0096110 A1 | 5/2004 | Yogeshwar et al. | |
| 2004/0162757 A1 | 8/2004 | Pisaris-Henderson | |
| 2004/0204997 A1 | 10/2004 | Blaser et al. | |
| 2004/0234049 A1 | 11/2004 | Melideo | |
| 2004/0234064 A1 | 11/2004 | Melideo | |
| 2004/0236441 A1 | 11/2004 | Melideo | |
| 2004/0254859 A1 | 12/2004 | Aslanian, Jr. | |
| 2004/0258048 A1 | 12/2004 | Melideo | |
| 2004/0260413 A1 | 12/2004 | Melideo | |
| 2005/0010795 A1 | 1/2005 | Tagawa et al. | |
| 2005/0021744 A1 | 1/2005 | Haitsuka et al | |
| 2005/0044238 A1 | 2/2005 | Jacob et al. | |
| 2005/0048961 A1 | 3/2005 | Ribaudo et al. | |
| 2005/0065811 A1 | 3/2005 | Chu et al. | |
| 2005/0071509 A1 | 3/2005 | Faber et al. | |
| 2005/0080878 A1 | 4/2005 | Cunningham et al. | |
| 2005/0086104 A1 | 4/2005 | McFadden | |
| 2005/0119957 A1 | 6/2005 | Faber et al. | |
| 2005/0165666 A1 | 7/2005 | Wong et al. | |
| 2005/0203799 A1 | 9/2005 | Faber et al. | |
| 2005/0209874 A1 | 9/2005 | Rossini | |
| 2005/0216341 A1 | 9/2005 | Altberg et al. | |

| | | | |
|---|---|---|---|
| 2005/0216345 A1 | 9/2005 | Altberg et al. | |
| 2005/0220289 A1 | 10/2005 | Reding et al. | |
| 2005/0222908 A1 | 10/2005 | Altberg et al. | |
| 2005/0251445 A1 | 11/2005 | Wong et al. | |
| 2006/0095343 A1 | 5/2006 | Clark et al. | |
| 2006/0184378 A1 | 8/2006 | Agarwal et al. | |
| 2006/0215826 A1 | 9/2006 | Lurie et al. | |

FOREIGN PATENT DOCUMENTS

| | | |
|---|---|---|
| EP | 04253389.3 | 9/2004 |
| GB | 2329046 A | 10/1999 |
| JP | 409233441 A | 9/1997 |
| JP | 409319812 A | 12/1997 |
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |
| WO | 0057326 | 9/2000 |
| WO | WO 00/73960 | 12/2000 |
| WO | WO 01/01217 | 1/2001 |
| WO | 0120518 | 3/2001 |
| WO | 0127825 | 4/2001 |
| WO | WO 01/28141 | 4/2001 |
| WO | WO 01/44973 | 6/2001 |
| WO | WO 02/44870 | 6/2002 |
| WO | PCT/US01/51181 | 3/2003 |

OTHER PUBLICATIONS

Telecommunications Buyers Guide and Directory, Editor & Publisher, pp. 29TC-38TC, Feb. 1994.
Aspect Telecomm: Aspect Integrates the Web into the Call Center; M2 Presswire, Aug. 1996.
Information, Bid and Asked, Forbes, Aug. 20, 1990, 92.
Attachmate Ready to Answer 'Net questions, Network World, Apr. 8, 1996, 37.
US Courts to Launch First Federal 900 Service, Federal Computer Week, Sep. 28, 1992, 8.
Company Devoted to Hot-Line Support, Computer Reseller News, Oct. 21, 1991, 48.
For Telesphere's Clients, Dial '1-900 TUF LUCK',Business Week, Sep. 9, 1991, 88.
When Business Plan and real World Clash, Wall Street Journal, Jun. 9, 1999, B1.
Hidden Cost of Tech Support, PC World, May 1995, 143.
NetBazaar: Networked Electronic Markets for Trading Computation and Information Services, ECDL 1998—Research and Advanced Technology for Digital Libraries, 839.
Multimedia Collaborative Remote Consultation Tools via Gigabit WAN in Teleradiology, IEEE 1994 Phoenix, 417.
Multimedia Communication in a Medical Environment, IEEE 1991 Singapore I.C. on Networks, 166.
A New Teleconsultation Terminal System Using ISDN, NTT Review, Jul. 1991, 37.
MiniPay: Charging Per Click on the Web, CNISDN, 1997 v29, 939.
Caring for Customers: Real-time text chat and telephony provide personalized customer support and turn queries into sales leads, Internet World Media, Sep. 1999.
Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.
Masahiko Hase, Shuji Kawakubo and Mineo Shoman, "Advanced Videophone System Using Synchronized Video Filing Equipment," NTT Review, vol. 3, No. 4 Jul. 1991, pp. 29-36.
Franco Mercalli and Roberto Negrini, "The ESSAI Teleshopping System: An Example of a Broadband Multimedia Application," Publication No. 0-7803-1820-X/94, IEEE, 1994, pp. 572-576.
Abhaya Asthana and Paul Krzyzanowski, "A Small Domain Communications System for Personalized Shopping Assistance," Proceedings of ICPWC'94, Publication No. 0-7803-1996-6/94, IEEE, 1994, pp. 199-203.

Linda Littleton, "Meet the Shadowy Future," Proceedings ACM SIGUCCS User Services Conference XXII, Ypsilanti, Michigan Oct. 16-19, 1994, pp. 205-210.
L. F. Ludwig and D.F. Dunn, "Laboratory for Emulation and Study of Integrated and Coordinated Media Communication," Conference on Office Information Systems, Mar. 23-25, 1988, Sponsored by ACM SIGOIS and IEEECS TC-OA in cooperation with IFIP W.G. 8.4, pp. 283-291.
E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.
ISDN Tutorial:Definitions, http://www.ralphb.net/ISDN/defs.html , printed on Apr. 21, 2000.
ISDN Tutorial: Interfaces, http://www.ralphb.net/ISDN/ifaces.html , printed on Apr. 21, 2000.
"USA Global Link Brings Interactively to Internet Shopping", Business Wire., Oct. 1998.
"Lucent Technology and Netscape Team to Deliver Lucent Ecommerce Solutions", Business Wire, Sep. 1998.
"TriNet's, Help Me, I'm Stuck, Internet Voice Button Services Pushes Web Pages to Online Users", Business Wire, Mar. 1998.
Tehrani, Rich, "e-Rip Van Winkle and the 60 second Nap", Call Center Solution, vol. 18, No. 2, pp. 16(3)., Aug. 1999.
"Netcall Internet Call Buttons Enhance E-Commerce Customer Service and Sales", PR Newswire, p. 7431., Aug. 1999.
"Connecting to On-Line Car Shoppers: Auto Sellers Use Netcall Internet Call -Button Technology to Turn Clicks into Interactive Sales", Business Wire, p. 4089., Jul. 1999.
Davey, Tom, "Wheeling and Dealing Online", PC Week, vol. 13, No. 45, pp. 1, 129., Nov. 1996.
Collett, Stacey & Julie King, "Why Online Browsers Don't Become Buyers", Computerworld, vol. 33, No. 48, p. 14.
Information about Expertcity.com retrieved from the Internet [URL: http://www.expertcity.com] on Nov. 6, 2000.
"Rent-An Expert On the Web", Information Week, p. 75, Sep. 1999.
"Expercity.com Launches Premier Online Marketplace for Expert Services", PR Newswire, Aug. 1999.
Information about keen.com retrieved form the Internet [URL: http://www.keen.com], on Oct. 24, 2000.
Cynthia Hodgson, "Online Expert Databases & Services", Econtent, Dec. 1999, p. 48-53.
Jeff Peline, "Net Firm to Connect Users by phone", CNET News. com, [retrieved from http://news.cnet.com on Oct. 24, 2001.
"Keen.Com Launches First Live Answers Community", Press release retrieved from http://www.keen.com on Oct. 24, 2000.
John Healey, "From A-Z, You Can Sell Advice Online", Mercury News [retrieved from http://wwwO.mercurycenter.com on Oct. 24, 2001.
Joseph Menn, "An Expert? There's Now a Home for You on the Internet", Los Angeles Times [retrieved from http://www.denverpost.com on Oct. 24, 2001.
"Walker Digital Issued Landmark U.S. Appl. No. 5,862,223 for Global Internet Marketplace for Experts", Business Wire, Jan. 26, 1999, Walker et al.
Qcircuit Web Site (www.qcircuit.com).
Infomarkets.com Web Site (www.infomarkets.com).
Intellect Exchange Web Site (www.intellectexchange.com).
Answers.com Web Page (www.answers.com).
Chris Ott, "Making Good on the Information Economy", Denver Business Journal, Dec. 17, 1999, p. 27.
Michael Rogers et al, "Experts abound at New Web Sites", Library Journal, Mar. 1, 2000, pp. 22-24.
"Surfbrains.com: Brains online save time & money", M2 Presswire, Jul. 11, 2000.
Michael Kanellos, "Do You Want To Know The Meaning of Life?", Computer Reseller News, Mar. 3, 1997, pp. 72-74.
"Applying Technology News", Accounting Technology, Feb./Mar. 1997, p. 14.
Ellen Greenblatt, "Have you ever wondered . . . ", Datamation, Oct. 1997, p. 126.

"Information for sale: Commercial Digital Reference and AskA Services", Virtual Reference Desk, Sep. 20, 1999, at www.vrd.org/AskA/commAskA.html.

EXP.com Web Site at www.exp.com/.

The Web Site at www.experts-exchange,com/.

Electronic Emissary at www.tapr.org/emissary/.

The Web Site at www.allexperts.com/.

U.S. Appl. No. 09/596,466, filed Jun. 19, 2000, Hector A. Agdeppa.

U.S. Appl. No. 60/198,642, filed Apr. 20, 2000, Rothschild et al.

U.S. Appl. No. 60/471,535, filed May 19, 2003, Melideo.

Big Green Blog: Jan. 2005 Archives, Feb. 21, 2006.

Information about Expertcity.com retrieved from the Internet [URL:http://www.expertcity.com] on Apr. 9, 2000.

Ingenio Press Archives for 2004, www.ingenio.com, Feb. 21, 2006.

"Introducing 1-800-FREE411: First Nationwide Free Telephone Directory Assistance Service" Jingle Networks, Inc., Huntington Beach, Calif., Sep. 20, 2005.

"Jambo Launches to Connect People and businesses From the Internet to the Phone", Agoura Hills, Calif. May 3, 2005.

"Jambo Names Netzero Co-founder Stacy Haitsuka to New Post of Chief Information Officer", Agoura Hills, Calif., Jul. 5, 2005.

"Jambo Receives $5 Million in Financiing from Kline Hawkes & Co., Westlake Venture Partners, Others", Agoura Hills, Calif., Oct. 17, 2005.

Keen.com, Inc. v. InfoRocket.com, Inc., Complaint for Patent Infringement, Trade Dress Infringement and Unfair Competition; Demand for Jury Trial filed Aug. 31, 2001, pp. 1-8 plus 17 pgs. of attachments.

Keen.com, Inc. v. InfoRocket.com, Inc., Preliminary Injunction Hearing, pp. 286-289 (Jan. 8, 2002).

Keen.com Feb. 4, 2006.

Keen.com Plans Web Service Allowing Customers to Hold Private Phone Chats, Don Clark, Wall Street Journal, Nov. 8, 1999.

Keen.com raises $60 Million from Prestigious . . . , Business Wire, Jan. 11, 2000.

PCT Search Report for PCT Application No. PCT/US01/48284, filed Oct. 30, 2001 (corresponding to U.S. Appl. No. 09/702,217) mailed May 13, 2002 (7 pgs.).

Sell and buy advice online, The Ottawa Citizen, Nov. 29, 1999.

"UpSnap Selects LookSmart to Sell Premium Listings on FREE 411 Service for Text-Enabled Cell Phones", Nov. 4, 2004.

"Welcome to Jambo—the leader in Pay-per-Call Solutions" (search results) Oct. 17, 2005.

ADS-Click, "ADS-click Adds Skype-Based Pay-Per-Call Advertising Capabilities to Its Private-Labeled Solution, which will be Unveiled at ad:tech New York," Market Wire, Oct. 10, 2005.

ISA/US, International Search Report for International Application No. PCT/US05/12061, 3 pages, Nov. 17, 2006.

Jingle Networks, Inc., "1-800-FREE411 Provides Two Great Opportunities to Acquire New Customers," available at least by Oct. 20, 2005.

Information about Expertcity.com retrieved from the Internet [URL: http://www.expertcity.com] on Nov. 6, 2000.

"Rent-An Expert On the Web", Information Week, p. 75, Sep. 1999.

John Healey, "From A-Z, You Can Sell Advice Online", Mercury News [retrieved from http://wwwO.mercurycenter.com on Oct. 24, 2001.

Joseph Menn, "An Expert? There's Now a Home for You on the Internet", Los Angeles Times [retrieved from http://www.denverpost.com on Oct. 24, 2001.

Qcircuit Web Site (www.qcircuit.com), Aug. 8, 2000.

Infomarkets.com Web Site (www.infomarkets.com), Aug. 8, 2000.

Intellect Exchange Web Site (www.intellectexchange.com), Aug. 8, 2000.

Answers.com Web Page (www.answers.com), Aug. 8, 2000.

Chris Ott, "Making Good on the Information Economy", Denver Business Journal, Dec. 17, 1999, p. 27.

Michael Rogers et al, "Experts abound at New Web Sites", Library Journal, Mar. 1, 2000, pp. 22-24.

"Surfbrains.com: Brains online save time & money", M2 Presswire, Jul. 11, 2000.

EXP.com Web Site at www.exp.com/, Sep. 20, 2000.

The Web Site at www.experts-exchange,com/, Apr. 9, 2000.

Electronic Emissary at www.tapr.org/emissary/, Apr. 9, 2000.

The Web Site at www.allexperts.com/, Apr. 9, 2000.

* cited by examiner

SYSTEMS AND METHODS FOR ARRANGING A CALL

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention generally relates to the field of electronic information delivery. More particularly, an embodiment of the present invention provides a technique for arranging a communication channel with a service provider.

BACKGROUND

Currently, consumers interested in acquiring services must first identify the service provider who is capable of providing the required services. This usually means perusing a telephone directory, which can become frustrating and time-consuming if the service providers telephoned are not immediately available. A phone book (whether a bound paper book or an electronic directory) is also not very effective if the service provider's business category is unknown.

The availability of some telephone book services over the Internet has somewhat lessened the time involved in finding a service provider. The present Internet-based, systems, however, fail to address other issues such as facilitating the contact between the consumer and the service provider.

Also, the present services fail to provide a measurable way of deciding which service provider may fit a consumer's needs. For example, there may be many lawyers listed in a telephone book without specifying their expertise or other verifiable information.

Accordingly, with the present solutions, a consumer may have to spend a lot of time to find a service provider, research the service provider's expertise, experience and the like, and establish contact with the selected service provider.

SUMMARY OF THE INVENTION

Novel systems and methods for arranging a call are disclosed. In an embodiment of the present invention, a method of arranging a call with a service provider is disclosed. The method includes: determining whether the service provider accepts arranged calls; if it is determined that the service provider does not accept arranged calls, contacting the service provider to request arranged calls from the service provider; and if it is determined that the service provider accepts arranged calls, requesting an arranged call.

In another embodiment of the present invention, the arranged call request requires provision of one or more items selected from a list comprising a date, a time, a contact type, and a deposit.

In a further embodiment of the present invention, the service provider is contacted to enable the arranged call request by an act selected from a group comprising sending an email, placing a phone call, sending a page, and sending a piece of mail.

In yet another embodiment of the present invention, the arranged call includes an option selected from a group comprising taking a call now, taking a call within a requested period of time, and making an appointment.

In a different embodiment of the present invention, the option is selected by the service provider, a consumer, or both.

In a further embodiment of the present invention, the option is signaled through one or more devices selected from a group comprising telephone, computer, personal digital assistant (PDA), and pager.

BRIEF DESCRIPTION OF THE DRAWINGS

The invention is illustrated by way of example and not limitation in the figures of the accompanying drawings, in which like references indicate similar or identical elements, and in which.

DETAILED DESCRIPTION

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In addition, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, optical disks, compact disc-read only memories (CD-ROMs), and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data.

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Figure 1:
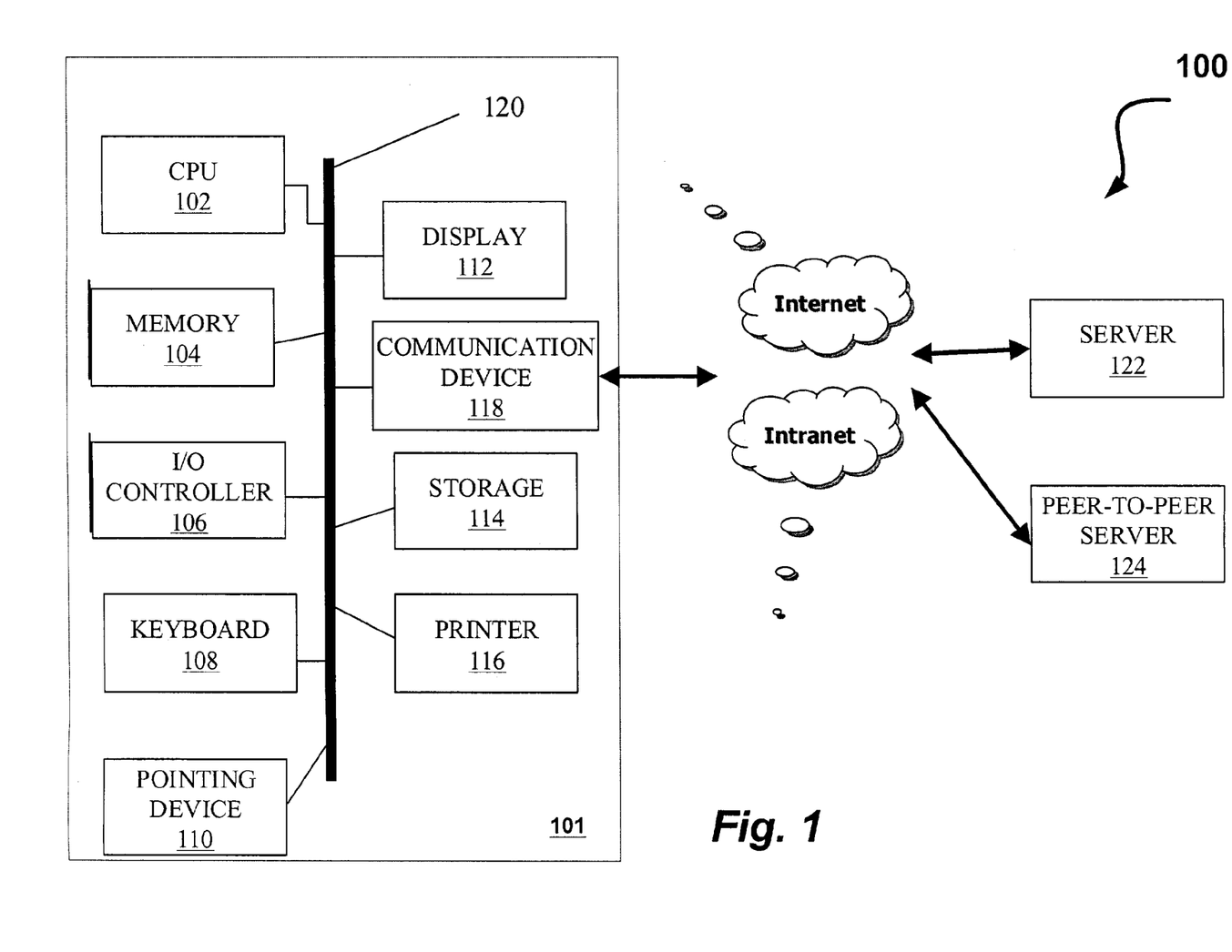
FIG. 1 is a simplified exemplary block diagram of a computer system in which the present invention may be embodied.

FIG. 1 illustrates an exemplary block diagram of a computer system 100 in accordance with an embodiment of the present invention. It is envisioned that the computer system 100 may be utilized to implement various embodiments of the present invention. The system 100 includes a computer 101 which in turn includes a central processing unit (CPU) 102, a main memory 104, an input/output controller 106, a keyboard 108, a pointing device 110 (e.g., mouse, track ball, pen device, or the like), a display device 112, and a mass storage 114 (e.g., hard disk, optical drive, or the like). Additional input/output devices, such as a printing device 116, may be included in the computer 101 as desired.

A communication device 118 may provide access to online services for example via the Internet or an intranet. The communication device 118 can be selected from a variety of devices such as an analog modem, a network card such as an Ethernet, Fast Ethernet, and Token Ring, a digital modem such as a digital subscriber line (DSL) and its varieties such as asynchronous DSL (ADSL), a wireless modem, and the like. The connection to the Internet and/or an intranet may provide access to a server 122 which can be any type of a server including a web server, file transfer protocol (FTP) server, Novell server, Microsoft Windows-based servers, and the like.

As shown in FIG. 1, access to a peer-to-peer server 124 may also be provided through the Internet and/or an intranet. As illustrated, the various components of the computer 101 may communicate through a system bus 120 or similar architecture. In an embodiment, the computer system 100 includes an IBM-compatible personal computer utilizing an Intel microprocessor, which is available from several vendors (including IBM of Armonk, N.Y.). Those with ordinary skill in the art understand that any type of computer system may be utilized to embody the present invention, including those made by Hewlett Packard of Palo Alto, Calif. Also, instead of a single processor, two or more processors can be utilized to provide speedup in operations.

Figure 2:
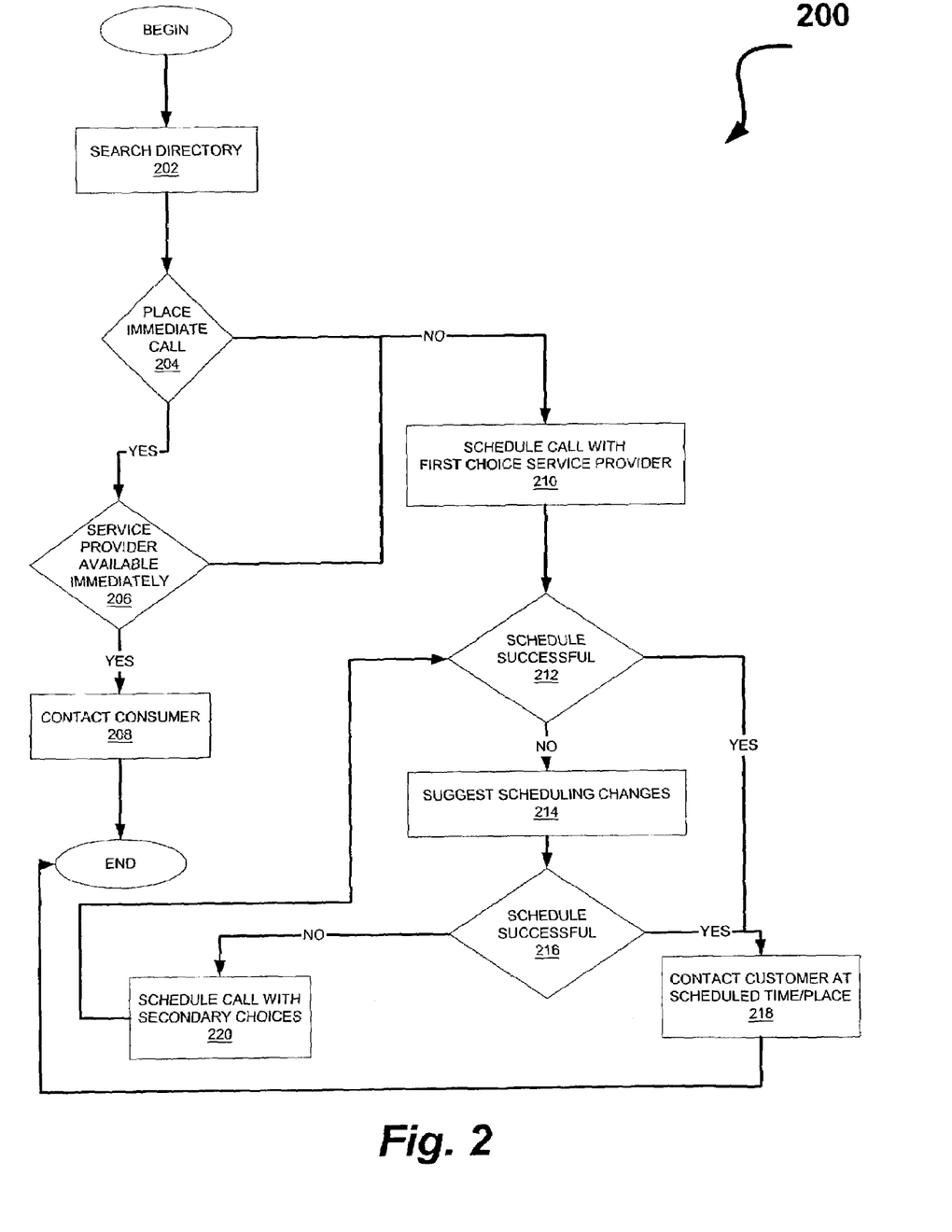
FIG. 2 illustrates an exemplary flow diagram of a service provider contact facilitation method 200 in accordance with an embodiment of the present invention.

FIG. 2 illustrates an exemplary flow diagram of a service provider contact facilitation method 200 in accordance with an embodiment of the present invention. The method 200 starts in a stage 202, which allows a consumer having access to a server (such as those discussed with reference to FIG. 1) to search a directory of service providers. In an embodiment of the present invention, the directory may include information regarding the service providers' experience, background, availability, preferences, and reviews (e.g., done by impartial third parties, previous consumers, entities specializing in verifying background information, and the like).

In one or more embodiments of the present invention, the following techniques may be utilized to search for a service provider:

to receive advice on a particular topic, a predefined category may be selected by a consumer (e.g., which may further identify topics, and subtopics);

a search engine may be utilized by typing in the word or words that best describe the subject for which the consumer wishes to receive advice; and/or a search may also be done for specific advisors by typing their name (e.g., member name, real name, expertise, and the like).

It is envisioned that the search may be performed using Boolean, case-sensitive, wildcard-based, and the like. Once a consumer selects a service provider, a stage 204 determines whether the consumer would like to place an immediate call to the service provider. If it is determined that an immediate contact is requested, a stage 206 determines whether the selected service provider is available immediately. If the service provider is available immediately, the consumer is contacted in a stage 208 and the method 200 terminates. In accordance with an embodiment of the present invention, the immediate contact is established by a telephone call, an instant messenger, a videoconference, or the like.

In one embodiment of the present invention, the contact (208) may be established by calling the consumer after the consumer elects a call now option. The call may be placed through a regular phone system, over the Internet, a cellular phone, and the like. If the consumer's phone is busy, the system (such as that discussed with reference to FIG. 1, including the servers 122 and 124) may retry for a select number of times. A failure may be followed up with form of notification to the consumer such as an email, a voice call, a voicemail, a page, and/or an instant message. If a consumer only has a single phone line, the consumer may be instructed to hang up to receive the call in accordance with an embodiment of the present invention. In another embodiment of the present invention, after the consumer receives the call, the consumer may be prompted to press a code (such as a digit or name) to acknowledge the consumer's intention to pay for the service provider's time.

In yet another embodiment of the present invention, a recorded advice may be offered to the consumer instead of a live one for example, for a recipe, specific information, recurring advise, and the like. Moreover, provision of a recorded advice is envisioned to be especially beneficial in situations where live advice is unavailable (for example due to the time of day or a quiet period identified by, for example, the service provider). In a different embodiment of the present invention, the consumer can replay a recorded advice without incurring additional charges.

In a further embodiment of the present invention, the availability of the service provider (206) is determined by contacting the service provider through voice call, voice mail, email, and the like. Once the availability of the service provider is successfully determined, a call (or other communication channel such as those discussed herein) may be established in accordance with the stage 208.

In accordance with another embodiment of the present invention, the service provider is envisioned to be in control of his/her contact (e.g., giving out home number, cell number, email address, etc.). The computer system may manage the specifics such as the phone numbers. In other words, the service provider may maintain his/her persona as a system entity instead of having to give out number, emails, etc. For example, if the service provider decides to drive somewhere, he/she may inform the system that his/her contact phone number should be his/her cell phone number for the next one hour and then the service provider will be unavailable or available at a different contact number, location, and so on. Such a solution is envisioned to also maintain certain sensitive information protected. For example, for personal matching services, a partner may not want to provide his/her home number to everybody who is interested in establishing contact with that person.

In one embodiment of the present invention, the consumer joins a service to obtain access to service providers. The information required to join may include any combination of the following: an email address, a password, a phone number, whether the same phone number is used for accessing the Internet (i.e., a single phone line), and/or various option such as interest in receiving future mailings or information, agreeing with terms and conditions of a contract, and the like.

Figure 3:
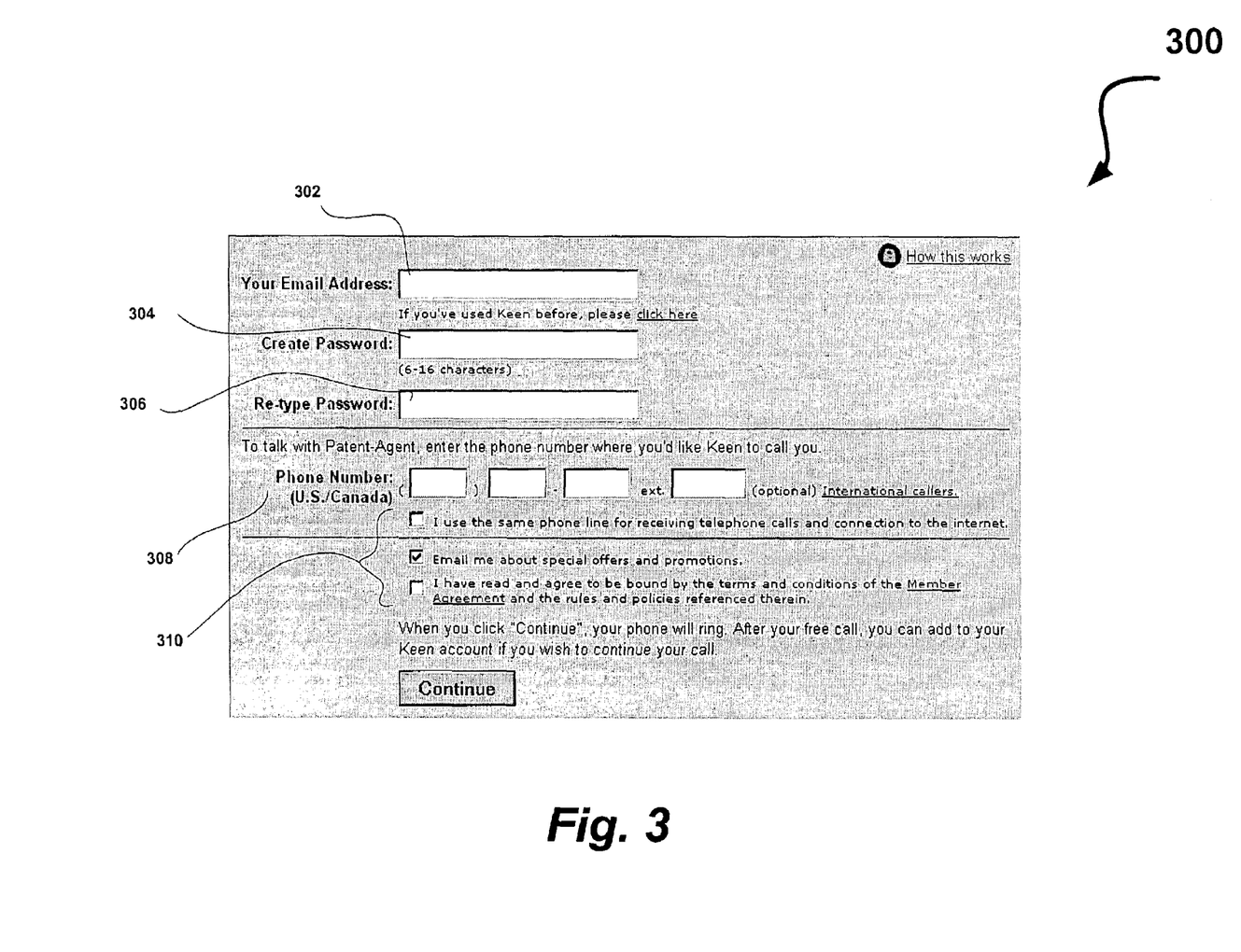
FIG. 3 illustrates an exemplary graphical user interface (GUI) 300 in accordance with an embodiment of the present invention.

FIG. 3 illustrates an exemplary graphical user interface (GUI) 300 in accordance with an embodiment of the present invention. The GUI 300 may be utilized to join a service to obtain access to service providers. The GUI 300 includes an email field 302, a password field 304, a password verification field 306, a phone number field 308, and various option buttons 310. After the consumer has successfully entered the requested data into the fields 302-310, the consumer may select the continue button 312 to proceed with the call (e.g., the stage of 208 of FIG. 2).

In a further embodiment of the present invention, the consumer contact (the stage 208 of FIG. 2) is established by emailing the consumer, visiting the consumer in person at the consumer's location, the service provider meeting the consumer at a determined location, and the like.

Referring back to FIG. 2, if the stage 204 determines that the consumer has not requested an immediate call or the stage 206 determines that the service provider is unavailable immediately, the method 200 resumes in a stage 210, which schedules a call with the selected service provider. In a stage 212, it is determined whether the scheduling of the stage 210 has been successful. If the scheduling has been successful, a stage 218 facilitates the contact with the consumer and the method 200 terminates. Otherwise, a stage 214 suggests scheduling changes.

After the stage 214, a stage 216 determines whether the scheduling was successful. If the stage 214 is successful, the method 200 resumes with the stage 218. Otherwise, a stage 220 suggests scheduling contact with a different service provider. In an embodiment of the present invention, the secondary choice of a different service provider may be made by the consumer during the original search (stage 202). Alternatively, the consumer may be directed (at stage 220) to select a secondary choice. After the stage 220, the method 200 returns to the stage 212.

Figure 4:
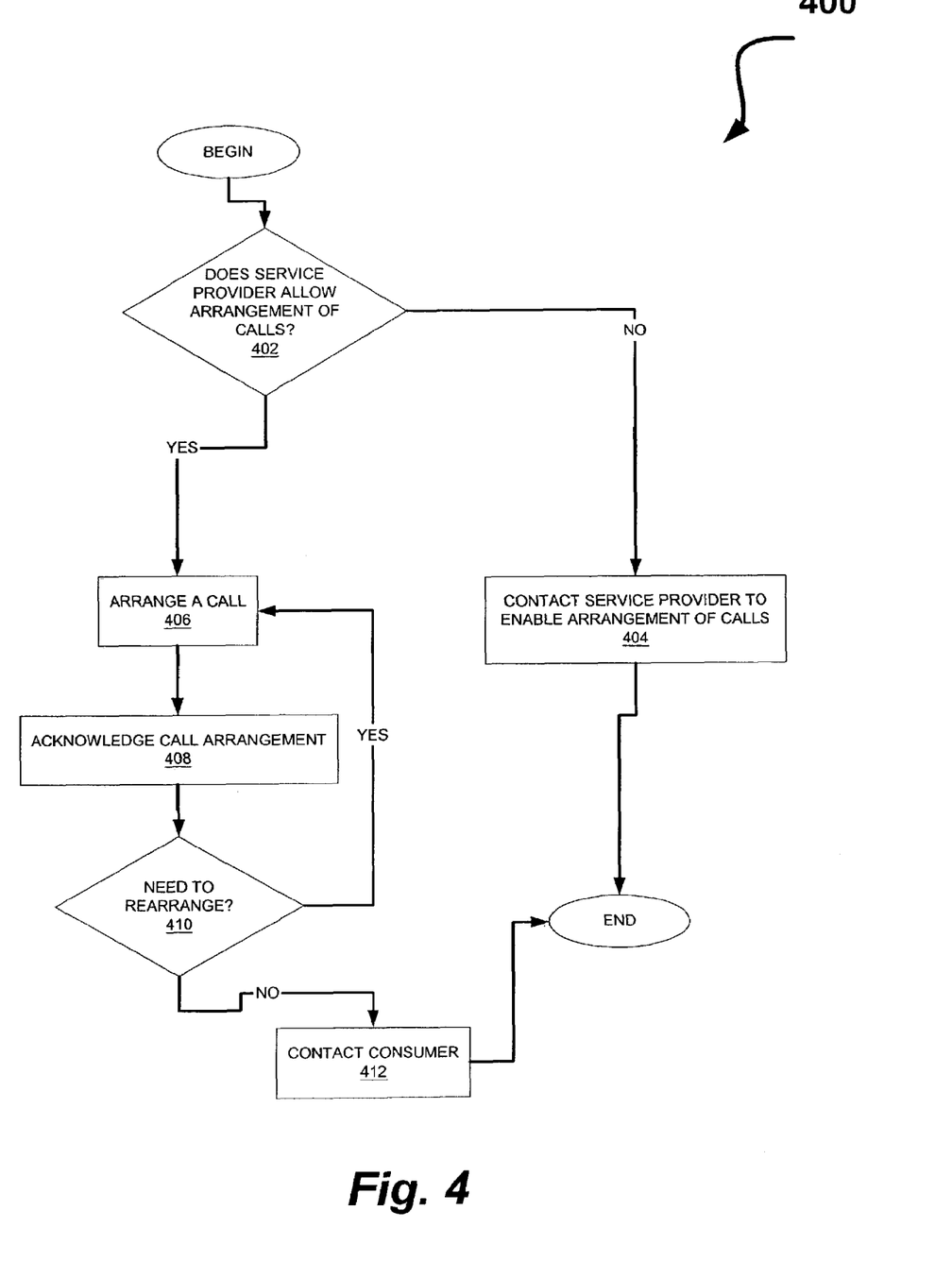
FIG. 4 illustrates an exemplary flow diagram of a method 400 for arranging a call with a service provider in accordance with an embodiment of the present invention.

FIG. 4 illustrates an exemplary flow diagram of a method 400 for arranging a call with a service provider in accordance with an embodiment of the present invention. In one embodiment of the present invention, the method 400 can be utilized to perform the stage 210 discussed with reference to FIG. 2 (e.g., upon the stage 206 determining that the service provider is unavailable immediately).

The method 400 starts with a stage 402, which determines whether a selected service provider (such as discussed with reference to FIG. 2) allows arrangement of calls. If the service provider does not allow call arrangement, a stage 404 permits the consumer to contact the service provider to request enablement of the service provider's call arrangement option. In an embodiment of the present invention, the stage 404 can be performed by sending an email, placing a call, sending a piece of mail, and the like. The method 400 terminates after the stage 404 and may be resumed once the service provider has enabled arrangement of calls.

If it is determined in the stage 402 that the service provider does allow for arrangement of calls, a stage 406 arranges a call. In an embodiment of the present invention, the stage 406 is performed by selecting a button on a web server (such as that discussed with respect to FIG. 1). Upon a consumer requesting a call arrangement, one or more of the following items may be requested or performed:

request a date and time for the call (e.g., by displaying available dates and times for the service provider, for example, by accessing the service provider's calendar, by requesting a specific date and time, requesting a call within a specified period (e.g., within two hours, four hours, etc.), and the like);

verifying the consumer's point of contact (e.g., telephone number, email address, address, and the like); and/or placing a deposit if necessary to reserve the appointment with the service provider (or adding more money to the consumer's account to enable a longer call).

In one embodiment of the present invention, the stage 406 is performed by sending a message (e.g., via telephone, email, page, and the like) to the service provider indicating that a consumer is waiting for the service provider contact. It is envisioned that at this point the requesting consumer may be placed in a queue (such as a first in first out queue). Alternatively, the same message or a second message may permit the service provider to manage the queue of consumers who have requested a call with the service provider.

In accordance with an embodiment of the present invention, many customers may line up to contact one service provider. The service provider may have visibility into his/her queue and may have functionality to let him/her take action based on the queue. The action might be to make him/herself available, re-order the queue, pick a valuable customer from the middle, and the like. In a further embodiment of the present invention, the service provider may be notified in accordance with the service provider's preferences. For example, the service provider may only be available during certain periods (or unavailable during quiet periods).

The method 400 continues with a stage 408, which acknowledges the arranged call made after the service provider has either accepted the suggested appointment or the appointment has been made for a period when the service provider has indicated he/she is available. Alternatively, the stage 408 may confirm that the arranged call has been made in accordance with the consumer's requested time and if the service provider becomes available at that time, the call will be placed (412).

In another embodiment of the present invention, the confirmation includes other information such as how long the consumer may be in contact with the service provider during the call (e.g., by determining how much money the consumer has on deposit and the service provider's rate), offer the consumer to add more money to his/her account, the contact number or location for the arranged call, and the like. It is envisioned that the acknowledgement may be made by contacting the consumer and/or service provider, for example, via email, a phone call, a page, and/or mail.

A stage 410 then determines whether there is a need to rearrange the acknowledged arranged call. In an embodiment of the present invention, the rearrangement may only be allowed within a period preceding the arranged call of the stage 408. For example, rearranging may only be allowed less than 24 hours prior to the arranged call. Alternatively, a penalty may apply for rearranging after a prescribed period. If the rearrangement is to be performed, the method 400 resumes at the stage 406. Otherwise, the consumer is contacted at the scheduled time (such as discussed with reference to FIG. 2) and the method 400 terminates.

In yet a further embodiment of the present invention, the service provider may be given options at the stage 406, such as responding to the consumer with a different time period (e.g., service provider will be unavailable within the requested time period but would be available now or agreeing to take the call at the requested time but offering an different time), agreeing to take the call immediately, or suggesting to the consumer to view the service provider's calendar for a different date. It is envisioned that the service provider may signal his availability and/or response through a phone keypad, computer, two-way pager, PDA, and the like.

In a different embodiment of the present invention, contact between the service provider and the consumer fails to be established, a message is sent to the consumer (e.g., via telephone, email, page, etc.) to indicate that either the service provider did not become available or was busy on other calls during the requested time. The consumer may then be given an option to try again to arrange a call with that service provider or contact another service provider (e.g., the stage 220 of FIG. 2).

In a further embodiment of the present invention, if the deadline has already passed, the service provider can follow up by sending a free minutes offer or a message (e.g., via phone, email, page, etc.) to the consumer to encourage contact at another time.

Whereas many alterations and modifications of the present invention will no doubt become apparent to a person of ordinary skill in the art after having read the foregoing description, it is to be understood that any particular embodiment shown and described by way of illustration is in no way intended to be considered limiting. For example, the techniques discussed with reference to various embodiments herein may be applied to any matching process such as matching singles, business or personal partners, buyers and sellers, and the like. Additionally, the communications established herein may be arranged through video sessions, chat sessions, and the like. Therefore, references to details of various embodiments are not intended to limit the scope of the claims which in themselves recite only those features regarded as essential to the invention.

What is claimed is:

1. A method of arranging a call for a session for real-time communication with a service provider, the method comprising:
   a data processing system displaying a list of service providers to a consumer via an internet connection;
   in response to a request from the consumer for an immediate session for real-time communication with a selected service provider selected from the list of service providers, the data processing system determining whether the selected service provider is available for the immediate session;
   in response to a determination that the selected service provider is not available for the immediate session to communicate with the customer, the data processing system determining whether the service provider accepts arranged sessions for real-time communication;
   in response to a determination that the service provider does not accept arranged sessions for real-time communication arranged via the data processing system, the data processing system permitting the consumer to request the service provider to allow the data processing system to arrange a session for real-time communication with the service provider; and
   in response to a determination that the service provider accepts arranged sessions for real-time communication, the data processing system making an arrangement according to a consumer requested appointment time for an arranged session for real-time communication between the service provider and the customer.

2. The method of claim 1 wherein the arrangement for the arranged session for real-time communication includes provision of one or more items selected from a list comprising a contact type, and a deposit.

3. The method of claim 2 wherein one or more of the items are predetermined by the service provider.

4. The method of claim 2 wherein one or more of the items are predetermined by the service provider's calendar.

5. The method of claim 2 wherein one or more of the items are provided by the consumer.

6. The method of claim 2 wherein the contact type corresponds to a telephone number.

7. The method of claim 2 wherein the deposit reserves the arranged session for real-time communication with the service provider.

8. The method of claim 1 wherein the service provider is contacted to enable the data processing system to arrange a session for real-time communication by an act selected from a group comprising sending an email, placing a phone call, sending a page, and sending a piece of mail.

9. The method of claim 1 wherein the arranged session for real-time communication includes an option selected from a group comprising taking a call now, taking a call within a requested period of time, and making an appointment.

10. The method of claim 9 wherein the option is selected by one or more of the service provider or and the consumer.

11. The method of claim 9 wherein the option is signaled through one or more devices selected from a group comprising telephone, computer, PDA, and pager.

12. A computer system comprising:
   a unit to display a list of service providers to a consumer via an internet connection;
   a unit, in response to a request from the consumer for an immediate session for real-time communication with a selected service provider selected from the list of service providers, to determine whether the selected service provider is available for the immediate session;
   a unit, in response to a determination that the selected service provider is not available for the immediate session to communicate with the customer, to determine whether the service provider accepts arranged sessions for real-time communication;
   a unit, in response to a determination that the service provider does not accept arranged sessions for real-time communication arranged via the computer system, to permit the consumer to request the service provider to allow the computer system to arrange a session for real-time communication with the service provider; and
   a unit, in response to a determination that the service provider accepts arranged sessions for real-time communication, to make an arrangement according to a consumer requested appointment time for an arranged session for real-time communication between the service provider and the customer.

13. The computer system of claim 12 further including a unit to contact the consumer once the arrangement is successful.

14. The computer system of claim 13 wherein the consumer is contacted by an act selected from a group comprising sending an email, placing a phone call, and sending a piece of mail.

15. A computer readable medium encoded with instructions that, when executed by a data processing system, will cause the data processing system to perform operations comprising:
- displaying a list of service providers to a consumer via an internet connection;
- in response to a request from the consumer for an immediate session for real-time communication with a selected service provider selected from the list of service providers, the data processing system determining whether the selected service provider is available for the immediate session;
- in response to a determination that the selected service provider is not available for the immediate session to communicate with the customer, determining whether the service provider accepts arranged sessions for real-time communication;
- in response to a determination that the service provider does not accept arranged sessions for real-time communication arranged via the data processing system, permitting the consumer to request the service provider to allow the data processing system to arrange a session for real-time communication with the service provider; and
- in response to a determination that the service provider accepts arranged sessions for real-time communication, making an arrangement according to a consumer requested appointment time for an arranged session for real-time communication between the service provider and the customer.

16. The computer readable medium of claim 15 wherein the operations further include contacting a consumer once the arrangement for the arranged session for real-time communication is successfully made.

17. The computer readable medium of claim 15 wherein the operations further include joining a service prior to the arrangement.

18. The computer readable medium of claim 17 wherein the joining includes receiving from the consumer at least one item selected from a group comprising an email address, a password, phone number, and selection of a plurality of optional services.

19. The method of claim 1 wherein the immediate session for real-time communication with the selected service provider comprises an immediate call for telephone conversation between the consumer and the selected service provider; and the service provider is requested to allow the data processing system to arrange a session for real-time communication with the service provider via a phone call to the service provider.

20. The method of claim 19 wherein the data processing system places the phone call to the service provider to request the service provider to allow the data processing system to arrange a session for real-time communication with the service provider.

21. The method of claim 1 wherein the determining of whether the selected service provider is available for the immediate session comprises a voice call to the selected service provider.

* * * * *